United States Patent
Ragaly

(10) Patent No.: US 6,362,550 B1
(45) Date of Patent: Mar. 26, 2002

(54) ELECTRIC MACHINE, ESPECIALLY A THREE-PHASE GENERATOR, WITH AN EXCITER

(75) Inventor: Istvan Ragaly, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,348

(22) PCT Filed: Oct. 5, 1999

(86) PCT No.: PCT/DE99/03194

§ 371 Date: Jun. 9, 2000

§ 102(e) Date: Jun. 9, 2000

(87) PCT Pub. No.: WO00/22719

PCT Pub. Date: Apr. 20, 2000

(30) Foreign Application Priority Data

Oct. 12, 1998 (DE) .......................................... 298 18 190

(51) Int. Cl.[7] .......................... H02K 19/38; H02K 11/04
(52) U.S. Cl. .................. 310/113; 310/112; 310/156.66; 310/68 D
(58) Field of Search ................................ 310/114, 112, 310/113, 68 R, 156.66, 156.69, 263, 68 D

(56) References Cited

U.S. PATENT DOCUMENTS

| 4,647,806 A | 3/1987 | Giovanni ................... 310/68 D |
| 4,918,343 A * | 4/1990 | Heinrich et al. ............... 310/58 |

FOREIGN PATENT DOCUMENTS

| DE | 15 13 850 A | 1/1970 |
| EP | 0 762 617 A | 3/1997 |

OTHER PUBLICATIONS

Patent Abstract of Hapan vol. 006, No. 155 (E–125), Aug. 17, 1982 & JP 57 075553 A (Hitachi Ltd) May 12, 1982.

* cited by examiner

Primary Examiner—Burton S. Mullins
(74) Attorney, Agent, or Firm—Michael J. Striker

(57) ABSTRACT

The electric machine, particularly a three-phase generator, has an exciter machine (26) in the form of a claw pole machine which supplies the exciter current necessary for the generator. The exciter machine is located to the side of the generator and has substantially smaller dimensions than the latter. At claws (28, 29) of the stator (25) which face the armature (32) of the exciter machine, permanent magnets (39) are located in the leakage flux area between the claws. Unwanted leakage fields are contained in this way.

2 Claims, 2 Drawing Sheets

ELECTRIC MACHINE, ESPECIALLY A THREE-PHASE GENERATOR, WITH AN EXCITER

BACKGROUND OF THE INVENTION

The invention is based on an electric machine, particularly a rotary current generator or three-phase generator with an exciter machine according to the generic part of the main claim. A three-phase generator of this kind is known from DE-OS 15 13 850. A generator with a relatively long life is obtained in this way because slip rings and carbon brushes are dispensed with and there is no voltage drop at carbon brushes in the exciter circuit. However, in the known three-phase generator with exciter machine, its output is not fully utilized because of leakage flux occurring between the claw poles of the stator of the exciter machine.

SUMMARY OF THE INVENTION

The three-phase generator according to the invention with the characterizing features of the invention has the advantage over the prior art that leakage flux is prevented between the claws and additional permanent-magnet flux is formed so that the output of the exciter machine is increased. Further advantages of the invention are indicated in the subclaims, the following description and drawing.

DESCRIPTION OF THE PREFERRED EMBODIMENTS

Figure 1:
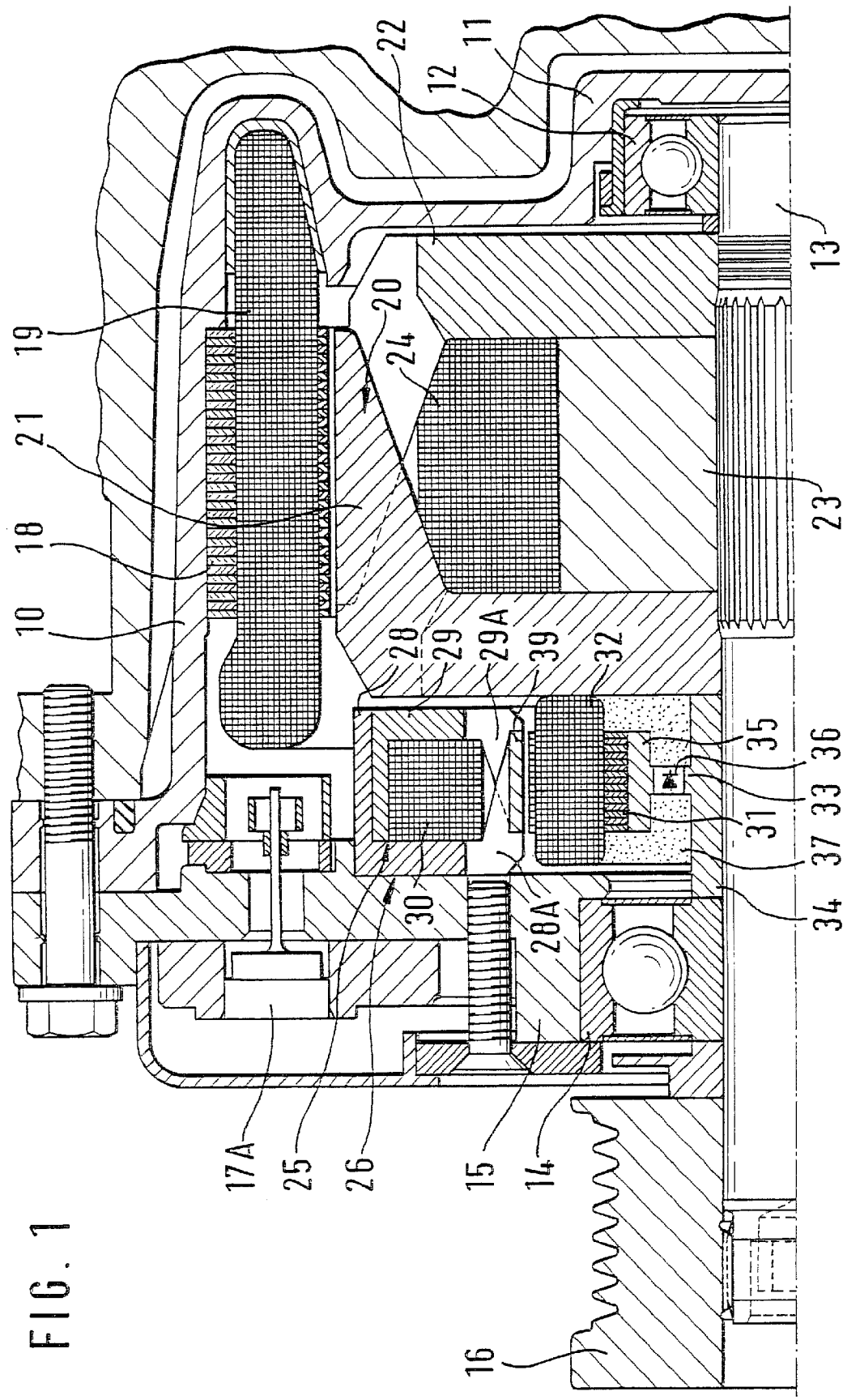
FIG. 1 shows a half-longitudinal section through a three-phase generator with exciter machine for a motor vehicle.

In FIG. 1, the approximately pot-shaped housing of a three-phase generator is designated by 10, a hub 11 being formed at its base. A ball bearing 12 for one end of a generator shaft 13 is located in the hub 11, while the other end of the generator shaft 13 is supported in a ball bearing 14 of a cover 15 closing the housing. However, the generator shaft 13 protrudes beyond the housing, a V-belt pulley 16 being arranged on this part. The cover 15 with additional parts located therein, such as rectifier 17 and a regulator 27 for controlling the electric currents, are not shown in more detail, with the exception of positive diodes 17A (see also the description pertaining to the wiring diagram according to FIG. 4).

A stator core 18 with a stator winding 19 is fastened to the inner wall of the housing 10 approximately in the center of the housing 10. A claw pole rotor 20 with claw pole halves 21, 22 which are connected with one another by a pole core 23 enclosing the generator shaft 13 is located inside the stator core 8. The claws of the claw pole halves, which claws are bent alternately from one side and the other, engage around an exciter winding 24 constructed as a ring winding. The claw pole rotor 20, including pole core 23, is connected with the generator shaft 13 so as to be fixed with respect to rotation relative to it.

Figure 2:
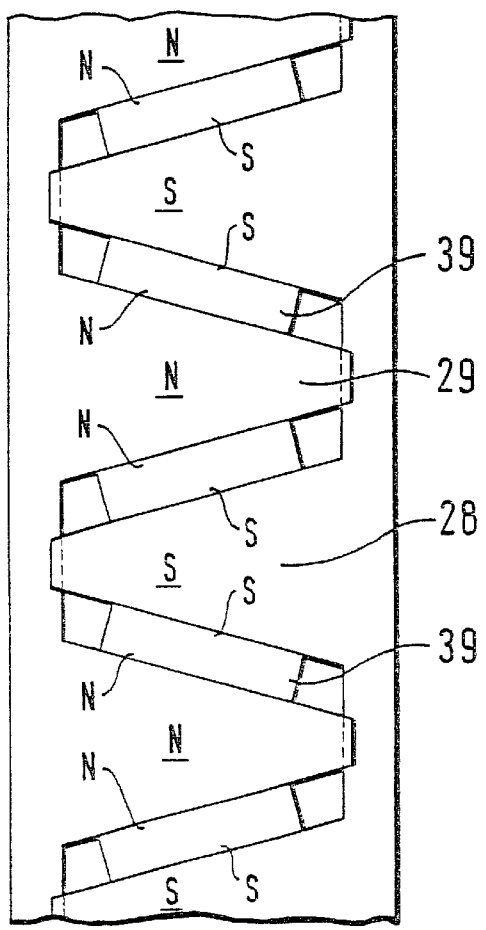
FIG. 2 shows a developed view of the claw poles.

Located next to the claw pole rotor 20 is an exciter machine 26 which is formed in a claw pole construction as an external pole system. The exciter machine has a smaller diameter than the generator. Two claw pole rings 28, 29 are fixedly arranged in the housing 10, a stationary exciter winding 30 being located therebetween. The armature 31 of the exciter machine 26 is located inside the claw pole stator and is connected with the generator shaft 13 so as to be fixed with respect to rotation relative to it. An armature winding 32 lies in the grooves of the armature which is formed of a laminated stack. The armature itself is located on a cylindrical spacer 34 which is arranged on the shaft so as to be fixed with respect to rotation relative to it, this spacer 34 having an annular collar 35 which carries the armature. Exciter diodes 36 are located in bore holes in the web 33 of this annular collar. A sealing compound 37 is located on both sides of this web and annular collar 35. Permanent magnets 39 are fastened between the claws 28A, 29A of the exciter machine. FIG. 2 shows a developed view of this claw pole system and claw pole rings 28, 29. Like poles of the permanent magnets and claws are connected with one another. This arrangement acts against unwanted leakage fields between the claws.

Figure 3:
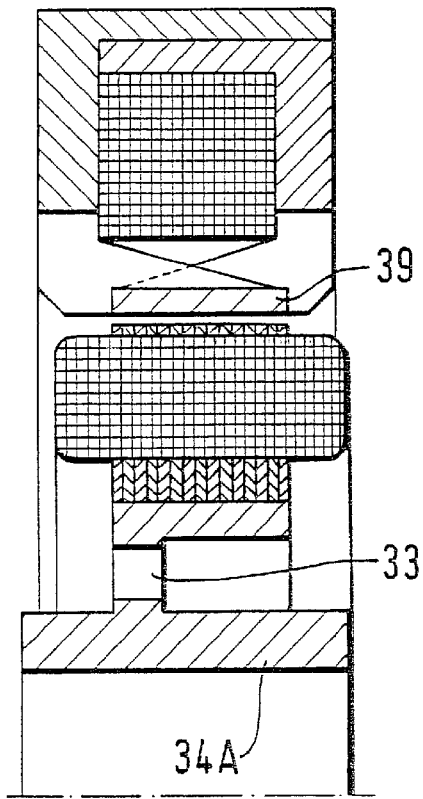
FIG. 3 shows a half-section through the exciter machine.

FIG. 3 shows a half-section of the exciter machine with a laterally offset web 33 and a spacer, designated by 34A, which therefore has a somewhat different construction. One of the permanent magnets 39 is also clearly shown in FIG. 3.

Figure 4:
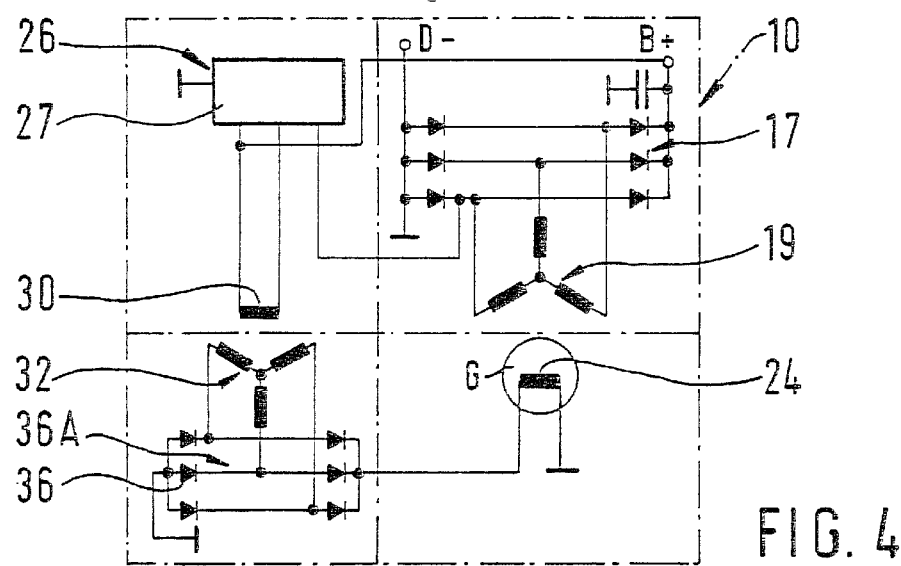
FIG. 4 shows a wiring diagram for the generator with exciter machine.

According to FIG. 4, the exciter winding 32 of the armature 31 of the exciter machine 26 is advisably a three-phase winding followed by a three-phase bridge rectifier, since this circuit is very suitable for optimal power output of the exciter machine and compact dimensions can be achieved with it. The minimum output of the exciter machine is determined in such a way that the nominal magnetic flux for the claw pole rotor of the generator is ensured at engine idling speed. The armature grooves of the exciter machine are advantageously insulated with Resicoat or a thin, heat-resistant foil. The rear winding heads of the armature winding 32 of the exciter machine can advisably be isolated from the claw pole system 21, 22 by a thin insulating disk. As was already mentioned above, the exciter diodes 36 of the exciter machine are fully sealed with high-temperature impregnation material or with plastic which is resistant to high temperatures.

The claws can also be constructed with parallel flanks so that the pole coverage and, therefore, also the power are increased. This is only useful because it reduces the inter-claw leakage with the permanent magnets inserted between the claws. If necessary, bevels or protuberances can be arranged at the discharging or wind-off edges of the claws of the external pole system. The claw poles for the external pole system can be cold-formed, hot-forged, cast or also produced by cutting.

By means of the exciter diodes 36, the three-phase current generated in the exciter machine is supplied to the exciter winding 24 of the generator as direct current in a three-phase bridge rectifier arranged downstream of the exciter diodes 36. This accordingly generates a three-phase current in a conventional manner in the stator winding 19, which three-phase current is rectified by the rectifier bridge 17 and fed to the battery and consumers in the vehicle power supply. This is briefly illustrated, by way of addition, in the wiring diagram according to FIG. 4.

The generator is connected in the usual way to the bridge rectifier 17 by its three-phase stator winding 19 in a star circuit. One phase of the stator winding 19 is applied to a regulator 27, likewise known, which controls excitation and which regulates the current in the exciter winding 30 of the exciter machine 26 depending on the voltage generated at the generator. This current, in turn, induces an electromotive force (EMF) in the three-phase winding 32 in the armature 31 of the exciter machine which is supplied in rectified form to the exciter winding 24 by means of the exciter diodes. Since the claw pole rotor 20 of the generator and the armature of the exciter machine 26 are both mounted on the electrically conducting generator shaft 13, the negative pole of the rectifier bridge 36 and exciter winding 24 can be connected with the shaft 13, so that only one line needs to be guided from the negative pole of the rectifier bridge 36 A to the exciter winding 24.

I claim:

1. an electric machine, particularly a three-phase generator with a stator (18), including stator winding (19), arranged in a housing (1) and with a claw pole rotor (20) together with an exciter winding (24), which claw pole rotor (20) is fastened to the generator shaft (13) and cooperates with the stator, and with an exciter machine (26) in claw pole construction for the three-phase generator, which exciter machine (26) is connected laterally to the three-phase generator, and wherein the exciter machine supplies the exciter current necessary for the three-phase generator, the armature (31) of the exciter machine, together with the armature winding (32), being fixedly arranged on the generator shaft, while its claw pole rings (28, 29), including the exciter winding (30), are fixedly arranged in the housing (10), permanent magnets (39) are fixedly arranged between the claws (28A, 29A) facing the armature (31) of the exciter machine in such a way that like poles of the permanent magnets (39) and of the claws (2YA, 2GA) contact one another, the armature (31) of the exciter machine is connected with the generator shaft (13) via a spacer (34), and exciter diodes (36) are located in the spacer (34).

2. Machine according to claim 1, wherein the exciter diodes (36) are insulated by an impregnating substance (37) on both sides of the spacer.

* * * * *